United States Patent
Rollender

(10) Patent No.: US 7,565,131 B2
(45) Date of Patent: *Jul. 21, 2009

(54) EMERGENCY CALL BACK THROUGH INTERSYSTEM PAGING

(75) Inventor: Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/073,700

(22) Filed: Mar. 8, 2005

(65) Prior Publication Data

US 2006/0205383 A1    Sep. 14, 2006

(51) Int. Cl.
H04M 11/04 (2006.01)
(52) U.S. Cl. ............... 455/404.1; 455/404.2; 455/521
(58) Field of Classification Search ............. 455/404.1, 455/456.2, 456.3, 458
See application file for complete search history.

(56) References Cited

U.S. PATENT DOCUMENTS

| 6,014,556 | A   | * | 1/2000  | Bhatia et al. ............. 455/404.1 |
| 6,038,437 | A   | * | 3/2000  | Zicker ..................... 455/404.1 |
| 6,556,816 | B1  | * | 4/2003  | Gafrick et al. ............ 455/404.1 |
| 6,571,092 | B2  | * | 5/2003  | Faccin et al. ............. 455/404.1 |
| 6,922,565 | B2  | * | 7/2005  | Rhodes et al. ............ 455/456.1 |
| 6,990,349 | B1  | * | 1/2006  | Idrissi ....................... 455/450 |
| 7,302,250 | B2  |   | 11/2007 | Chin et al. ................ 455/404.1 |
| 2004/0141607 | A1 | | 7/2004  | Rollender ............. 379/210.01 |
| 2004/0203565 | A1 | | 10/2004 | Chin et al. ................ 455/404.1 |
| 2004/0203573 | A1 | | 10/2004 | Chin et al. ................ 455/404.1 |
| 2004/0203574 | A1 | | 10/2004 | Chin et al. ................ 455/404.1 |

OTHER PUBLICATIONS

"NENA Technical Information Document (TID) On PSAP Call Back to All 9-1-1 Callers, Combating Wireless E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

\* cited by examiner

*Primary Examiner*—Temica M Beamer

(57) ABSTRACT

In the method, a paging identifier for a wireless unit is obtained using a unique call back identifier for an emergency call placed by the wireless unit in response to an emergency call back. Then, an emergency intersystem page, which provides the paging identifier of the wireless unit and identifies the emergency intersystem page as requesting paging of the wireless unit for an emergency call back, is sent.

19 Claims, 3 Drawing Sheets

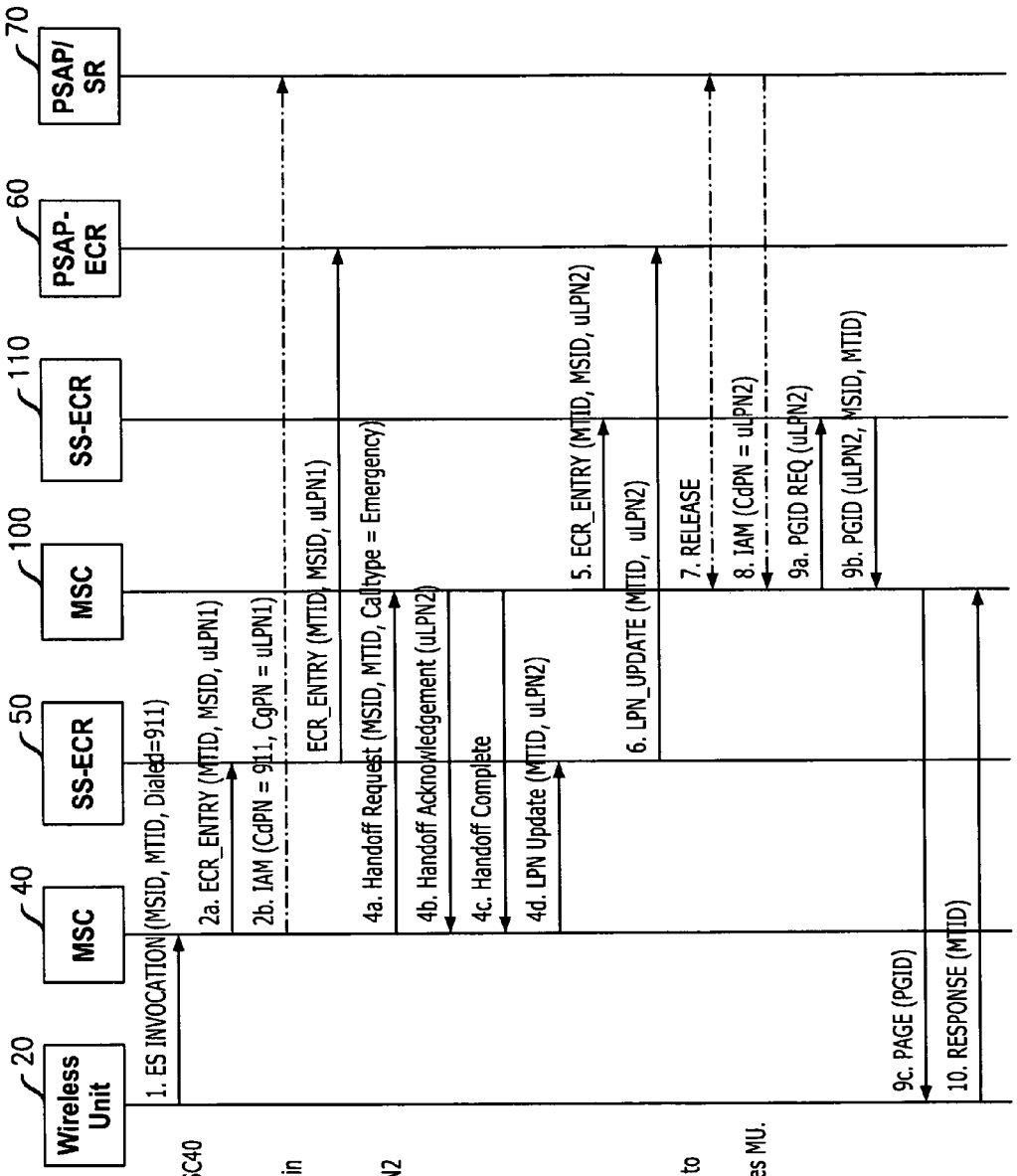

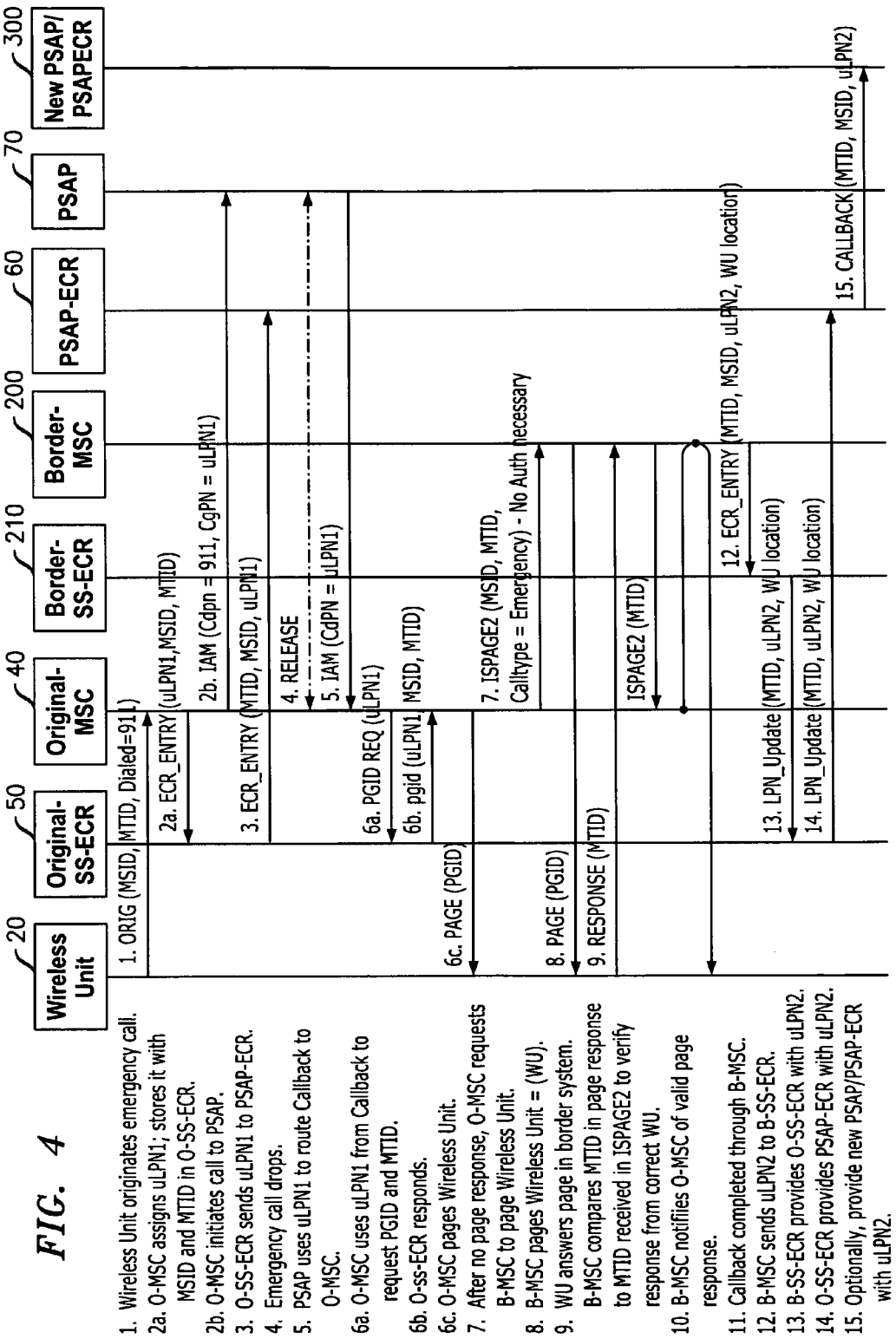

EMERGENCY CALL BACK THROUGH INTERSYSTEM PAGING

BACKGROUND OF THE INVENTION

Handling emergency service calls made by subscribers pose several hurdles not encountered with, for example, land line devices. FIG. 1 illustrates an example of one of these hurdles. Consider the situation in which an emergency service call originates from a wireless unit WU while moving in a high-speed train. If the call is somehow disconnected or dropped before the emergency is completely reported, the Public Service Answering Point (PSAP) to which the emergency call was routed will attempt to call back the originator of the emergency call. However, as shown in FIG. 1, the caller may have moved from the coverage area 10 of an original wireless serving system to the coverage area 12 of a border system sometime after the call was dropped but before the call back could be completed. As a result, the wireless unit might not be reachable by the border system to deliver the call back. A border system is one of a group of other wireless systems, the identity of which is determined by, for example, a network operator. Border systems do not necessarily have coverage areas bordering the original serving system.

Current solutions for emergency call back to a wireless unit that has moved into a border system only work for when a mobile directory number (MDN) associated with the wireless unit is known at the PSAP. The MDN of a wireless unit is a dialable number. The MDN is dialed by a caller and used to route a call through the network to the wireless subscriber's home system. At the subscriber's home system, the home location register (HLR) contains the mobile subscriber identifier MSID associated with the subscriber's MDN. The MSID, not the MDN, is then used to route the call through the network to the serving wireless system and page the subscriber. The subscriber's MDN is provided by the home system to the serving system in a separate data file called the subscriber profile. Typically, the MSID is either a 10-digit mobile identification number (MIN) or a 15-digit International Mobile Subscriber Identifier (IMSI) programmed into a wireless unit by the service provider with whom the wireless unit user has entered into a service agreement. Accordingly, the MSID is not necessarily a dialable number.

In one solution for emergency call back where a wireless unit has moved into a border system, the emergency call back is routed to the wireless unit through the wireless unit's home system, which then delivers the call to the border system according to existing standards. This process involves the use of temporary local directory numbers (TLDNs) signaled from the border system to the home system; wherein the TLDN assigned to the emergency call back is used by the home system to deliver the call to the border system.

As will be appreciated, this can be a time consuming process, particularly for an emergency call, and is especially acute if the wireless unit is an international roamer or the home system and border system are separated by great distances.

Furthermore, as alluded to above, there is no solution for when the MDN of the emergency caller's wireless unit is unknown. The MDN could be unknown for many reasons, including (a) the wireless unit was never intended to be registered (there are such phones to use for emergency calls only), (b) the phone is new and has not yet been initialized by a service provider or (c) the subscription has expired and the wireless unit is no longer registered with a service provider. Some mobile phones also support a removable User Identity Module (R-UIM) or Subscriber Identity Module (SIM) that may contain the MSID and the MDN. If the R-UIM or SIM are not in the wireless unit, then the wireless unit can still be used to place an emergency call. However, there is no MDN or MSID known to the wireless unit or the serving system to provide the PSAP as a call back number.

SUMMARY OF THE INVENTION

The present invention provides for emergency call back even when a wireless unit has traveled from an original serving system to a border system.

In one embodiment, a unique call back number is created when the emergency call is placed by the wireless unit. A record of this emergency call back number is kept at the original serving system and the public service answering point (PSAP) along with a mobile terminal identifier (MTID) and a paging identifier (PGID) such as a mobile station identifier (MSID) for the wireless unit. The unique call back number, besides uniquely identifying the emergency call, also identifies, for example, the mobile switching center (MSC) serving the wireless unit. In one embodiment, the unique call back number includes information for routing a call to the MSC.

If the emergency call drops, the PSAP calls the wireless unit back using the unique call back number. Using the unique call back number, the MSC accesses the PGID for the wireless unit and pages the wireless unit. If the MSC does not receive a page response in period of time, the MSC issues an emergency intersystem page message to border systems. The border systems may be set in the MSC by a network operator. The emergency intersystem page message provides the PGID of the wireless unit and identifies the emergency intersystem page as requesting paging of the wireless unit for an emergency call back.

The border systems page the wireless unit in response to the emergency intersystem page. The MSC of the border system receiving a successful page response from the wireless unit then communicates with the original MSC to establish a connection with the PSAP.

The border MSC may also establish a new unique call back number that is recorded at the border system, and this new unique call back number may be used to update the unique call back number for the emergency call of the wireless unit at the original MSC and the PSAP.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 3 is a communication flow diagram illustrating the operation of a method of updating a unique call back number according to an embodiment of the present invention; and FIG. 4 illustrates a call flow diagram of an embodiment for emergency call back through intersystem paging according to the present invention.

DETAILED DESCRIPTION OF EXAMPLE EMBODIMENTS

An example architecture for implementing the methods according to the present invention will first be described. Then, generation of a unique call back number will be described. This will be followed by a description of performing emergency call back using the unique call back number, and an example of a method for updating a unique call back number will be described. Subsequently, an example of a method for emergency call back through intersystem paging will be described.

Architecture

Figure 2:
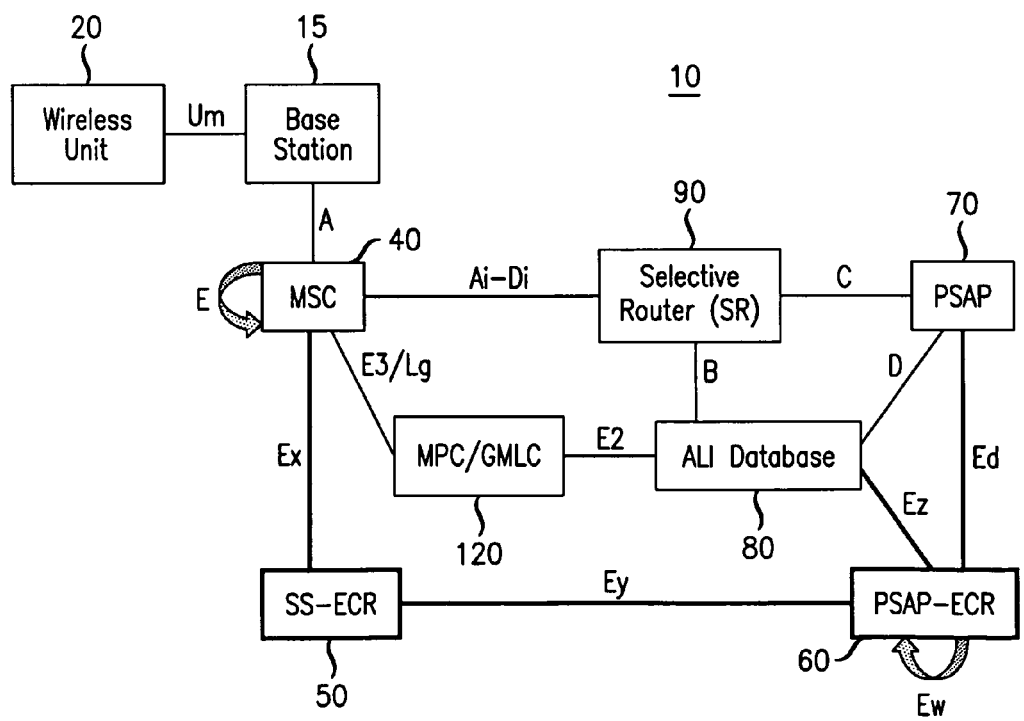
FIG. 2 illustrates an architecture of an embodiment of the present invention.

FIG. 2 illustrates an architecture of an embodiment of the present invention. FIG. 2 is reflective of an architecture 10 of a network reference model ("NRM") supporting mobile emergency service. Architecture 10 supports the unique identification of a wireless unit 20 originating an emergency "9-1-1" call and for enabling the call back of the wireless unit 20 originating the emergency "9-1-1" call using a unique identifier.

As shown in FIG. 2, a wireless unit 20 is shown for communicating an emergency call such as a "9-1-1" call to architecture 10. For the purposes of the present disclosure, an emergency "9-1-1" call corresponds with a call and/or a request for emergency services (e.g., police, fire department, road repair, and/or ambulance). The wireless unit 20 may be a wireless phone, wireless equipped PDA, wireless equipped computer/laptop, etc.

The communication, as originated by wireless unit 20, is conveyed to a mobile switching center 40 ("MSC") through a base station 15. Once the emergency "9-1-1" call is received by MSC 40, identification information associated with wireless unit 20 and which may have been sent by the wireless unit 20 in originating the emergency call, may be communicated to a serving system emergency call register 50 ("SS-ECR") associated with MSC 40. More particularly, the information associated with wireless unit 20 includes, for example, a mobile terminal identifier ("MTID"). The transfer of the MTID to SS-ECR 50 is performed by MSC 40 over a first NRM interface, $E_x$.

The MTID, as transferred to SS-ECR 50, might be realized by an International Mobile Equipment Identity ("IMEI"), electronic serial number ("ESN"), pseudo ESN ("pESN") and/or other mobile equipment identity ("MEID").

Besides the MTID, the identification information may also include a paging identity ("PGID") of the wireless unit 20. The PGID may be one of a number of communication standards-based identifiers (e.g., a MSID) supporting paging wireless unit 20 to deliver an inbound call if the emergency "9-1-1" call is dropped or disconnected. With respect to a GSM-based system, wireless unit 20 may be paged via an international mobile station identity ("IMSI") provided by wireless unit 20, a temporary mobile station identity ("TMSI") associated with the IMSI and/or an IMEI from wireless unit 20. In a CDMA2000 system, this paging step may be realized using a mobile identification number ("MIN"), an IMSI, a default mobile station identity ("dM-SID") from a non-subscriber initiated ("NSI") wireless unit(s), an ESN from wireless unit 20 and/or a pESN generated from an MTID within wireless unit 20.

In the event that the emergency "9-1-1" call from wireless unit 20 is dropped or disconnected from the base station and MSC 40, the PGID may be used to page wireless unit 20. To page wireless unit 20 in the circumstance of a call drop or disconnect, a Local Public Safety Number ("LPN") of MSC 40 may be needed to uniquely identify the switch serving the "9-1-1" caller (e.g., wireless unit 20). The Local Public Safety Number (LPN) is a dialable number NPA-NXX-XXXX, where the NPA-NXX uniquely identifies the MSC in the originating network. In order to avoid number portability and pooling complexities, the LPN may be taken from the native number block of the MSC. The LPN may assist in identifying SS-ECR 50 and for originating a call back to the wireless unit 20 originating the emergency "9-1-1" call in the event of a call drop or disconnect occurs as will be described below. Namely, as will be discussed in detail in the next section, the LPN may be used by the MSC 40 to generate a unique identifier or unique call back number for the wireless unit 20.

Emergency Service Routing Digits ("ESRD") to identify the originating cell site or sector or Emergency Service Routing Key ("ESRK"), which indicates that the location of the wireless unit is available from the MPC, may be employed for routing the emergency "9-1-1" call. As shown in FIG. 2 a mobile positioning center ("MPC") or geographical mobile location center ("GMLC") performs a geolocation operation on the wireless unit 20. The location information is communicated with an ESRK supplied by the MPC/GMLC 120 over an E3/Lg interface to the MSC 40 and over an E2 interface to an automatic line identifier ("ALI") database 80. The ALI database 80 stores location and other emergency call information for the public safety answering points (PSAPs) serving each geographic area. The MSC 40 routes the emergency call to a selective router 90 over an Ai-Di interface and supplies the ESRK and callback number (CBN) for the call. The selective router 90 signals the ALI database 80 over a B interface using the ESRK and CBN which signals the PSAP over the D interface that the call is to be routed. The selective router 90 simultaneously delivers the emergency call to the PSAP 70 over interface C.

The network elements and interfaces involved in providing an ESRK may be realized, in one embodiment, using existing communication standards. It should be noted that the Emergency Service Routing Digits may include, in one example, a string of numbers associated with a cell sector of the mobile switching center in which the emergency call originates, while the Emergency Service Routing Key may include a string of numbers associated with a wireless unit at a particular location at the time the 9-1-1 call originated.

The SS-ECR 50 may then send the received identification information over a network interface, $E_y$, to another emergency call register ("ECR") 60 associated with a public service answering point ("PSAP") 70. Consequently, the MTID, LPN, MSID or dMSID, ESRK and/or a unique identifier (e.g., unique call back number or "UCBN") and mobile location information may be re-transmitted from SS-ECR 50 to PSAP-ECR 60. It should be noted that each ECR such as PSAP-ECR 60 may be realized by a database. This and the other associated databases may be keyed on the ESRK, the MTID, the mobile station identity (e.g., a PGID such as MIN or IMSI) and/or the directory number of the caller.

The E interfaces depicted support signaling of emergency data and service requests through architecture 10 between MSC 40 and PSAP 70. Call handling instructions from PSAP 70, such as to establish a callback through MSC 40, may be communicated from PSAP 70 to PSAP-ECR 60 over an $E_d$ interface, on to SS-ECR 50 through an $E_y$ interface and from SS-ECR 50 to MSC 40 through an $E_x$ interface. Here, PSAP 70 may communicate with PSAP-ECR 60 directly over the Ed interface using a unique identifier (e.g., a unique call back number) or MTID as a key. Alternatively, PSAP 70 may communicate with ECR 60 indirectly through the ALI database 80 over the D and $E_z$ interfaces using ESRK or the unique identifier (e.g., a unique call back number) as a key.

The SS-ECR 50 and PSAP-ECR 60 may be implemented as a single entity. As shown, however, SS-ECR 50 and PSAP-ECR 60 are individual elements to allow consideration for one SS-ECR to serve one MSC and one SS-ECR to interface with many ECRs associated with PSAP 70. In addition, while one ECR may serve many PSAPs, one PSAP need only interface with one ECR. Moreover, PSAP 70 may have access to information in many ECRs through ECR networking over the $E_w$ interface.

Unique Call Back Number

Next, an embodiment of uniquely identifying one or more wireless units originating an emergency (e.g., a "9-1-1") call will be described. More particularly, an identifier that enables the call back of a wireless unit originating a "9-1-1" call will be described. For the purposes of explanation only, this unique identifier or unique call back number will be described with reference to FIG. 2 for the situation where the wireless unit 20 originates an emergency call with the MSC 40. When a wireless unit such as wireless unit 20 originates an emergency call, the serving MSC such as MSC 40 associates a routing tag with the wireless unit 20 originating the "9-1-1" call. For the purposes of the present disclosure, the routing tag may comprise, for example, a string of numbers corresponding with Emergency Service Routing Digits ("ESRD") and/or an Emergency Service Routing Key ("ESRK"). Consequently, while the routing tag may identify the originating system and destination PSAP, the routing tag may not uniquely identify the emergency "9-1-1" call if it is an ESRD or may be unable to uniquely identify the emergency "9-1-1" call once the originating call is no longer in progress. As discussed previously, the MSC 40 also receives the MTID as well as the PGID (e.g., MSID) for the wireless unit 20.

In this embodiment, once the routing tag is received, the MSC 40 generates the unique identifier. Unlike the routing tag, the unique identifier identifies the emergency "9-1-1" call even if the originating call is no longer in progress. In one embodiment, the unique identifier may be a ten (10) digit, unique call back number ("UCBN") associated with the serving MSC 40. In one embodiment, the unique call back number comprises a string of numbers corresponding with a local public safety number ("LPN") associated with the serving MSC 40. For example, the unique call back number may comprise six (6) fixed digits associated with the LPN (e.g., NPA+NXX) and four unassigned digits (XXXX). In this scenario, the four unassigned digits may translate into 10,000 unique number sequences to be assigned as a result of this generating step. As will be appreciated, because the unique call back number includes the LPN of the serving MSC, the unique call back number includes information identifying the serving MSC. Stated another way, the unique call back number includes routing information so that a call back using the unique call back number will be routed to the serving MSC. The last four digits of the unique call back number, also referred to as a unique LPN or uLPN, uniquely distinguishes the emergency call of the wireless unit from other emergency calls of other wireless units at the serving MSC.

Emergency Call Back

The MSC 40 may store the generated unique identifier uLPN in the SS-ECR 50 along with the MTID and PGID (e.g., MSID) of the wireless unit 20. The SS-ECR 50 may communicate the MTID and uLPN information to the PSAP-ECR 60. Namely, the UCBN is dynamically assigned at the serving system (e.g., MSC) when a 9-1-1 call is originated. It is stored in the SS-ECR such as SS-ECR 50 and the PSAP-ECR 60 as a key to those databases. If an emergency call drops, the PSAP 70 retrieves the call back information from the PSAP-ECR 60 and originates a call back. As stated above, the UCBN is a unique 10-digit dialable number based on the NPA-NXX from the LPN of the serving system. The last four digits are uniquely assigned to each call at the serving system. The UCBN is not a Mobile Directory Number (MDN) or Mobile Station ISDN Number (MSISDN) assigned to the calling subscriber by the home service provider. If the UCBN is used for call back by the PSAP 70, it is signaled to the serving system MSC, MSC 40 in this example, as the Called Party Number (CdPN). The MSC 40 uses the UCBN to request a PGID (e.g., MSID) from the SS-ECR 50. The PGID is then used by the MSC 40 to page the phone and complete the callback.

Based on existing guidelines, the UCBN may be signaled from the MSC 40 to the selective router 90 and on to the PSAP 70 as the Call Back Number (CBN) in the Calling Party Number (CgPN) or the Charge Number (CHGN) when the ESRD is populated in either the Generic Digits Parameter (GDP) or the Called Party Number (CdPN). When the ESRK is populated as either the CPN or CHGN, the UCBN may be populated in the other field or in the GDP.

If the UCBN is not signaled with a call routed by the ESRK, then the PSAP 70 may use the ESRK while the call is still in progress to obtain the UCBN from the PSAP-ECR 60 directly or via the ALI database 80. The ALI database 80 may get the UCBN from the PSAP-ECR 60 or the MPC/GMLC 120. The MPC/GMLC 120 may have the UCBN if it is provided by the MSC 40.

An Emergency Call Register (ECR) is a database holding emergency call detail information and call handling instructions for the MSC. The serving system ECR database, in this embodiment, is keyed on the UCBN, ESRK or MTID and also contains the MTID, PGID (e.g., MSID), ESRK or ESRD, UCBN and originating location for the emergency 9-1-1 call, as well as the LPN of the associated serving system. The LPN may be updated automatically as the wireless unit originating the emergency 9-1-1 call roams and is handed off (or over) from one serving system to another.

ECR entries may be created in different ways. An entry may be created at the originating network with the origination of a 911 call, through a download of entries from other ECRs or by manual entry. Manual entry of a MTID and any local LPN into the ECR associated with the PSAP allows the PSAP to call any wireless unit through the MSC even if the wireless unit was not used to originate an emergency 9-1-1 call. LPN Update procedures allow for the LPN of the serving system to be automatically entered into the SS-ECR after the wireless unit is located in the true serving system. The LPN is updated in other PSAP-ECRs and SS-ECRs through the Mobile E-9-1-1 Network.

The Mobile E9-1-1 Network may be used to exchange data between ECRs and trigger events in other network elements. An ECR is located with an MSC at the serving system (SS- ECR), a PSAP in the Emergency Services Network (PSAP-ECR), and any other call center handling emergency calls. For example, a secondary PSAP or a Telematics Call Center may have an ECR to track 9-1-1 calls and other outbound calls placed for their clients, to track inbound calls from clients or to remotely request service for clients through the serving system.

The ECR Network is used for more than exchanging emergency call information and tracking individual phones. The ECR network is also used to manage mobility for wireless units used to place an emergency 9-1-1 call and request services through the MSC. Messages are signaled through the network to support intersystem operations for Intersystem Roaming and Emergency Short Message Service for NSI Phones and International Roamers, Emergency Call Origination through the MSC for Telematics Call Centers, PSAP-to-PSAP Call Forwarding or Conference Calling through the MSC, LPN Update, Intersystem Paging for Emergency Call Back and possibly many other services. The PSAP-ECR acts like a Home Location Register (HLR) and the SS-ECR acts like a Visitor Location Register (VLR).

Updating Unique Call Back Number

Next, an embodiment of the method for updating the unique call back number will be described. For the purposes of example only, these method embodiments will be described with reference to the architecture of FIG. 2. However, it will be understood that the methodologies of the present invention are not limited to this architecture. As wireless unit 20 roams from one serving system or switch (e.g., MSC) to another, call back using an existing unique call back number assigned by the old serving system may not be possible. Instead, the new serving system assigns a new unique call back number. However, the emergency call may drop before the PSAP 70 or PSAP-ECR 60 obtains the new unique call back number assigned by the new serving system. The method according to the present invention provides ways of updating the call back number so that emergency call back may be performed even when the wireless unit roams.

FIG. 3 illustrates a call flow diagram of an embodiment for updating a unique call back number according to the present invention. As shown, in call flow step 1, the wireless unit 20 originates an emergency call to the MSC 40. The origination includes the called or dialed number of "9-1-1", and the MTID and the MSID of the wireless unit 20. The MSC 40 then creates the unique call back number (UCBN) for the emergency call of the wireless unit 20. As shown in FIG. 3, in this example embodiment, a uLPN1 is generated as the UCBN. The MSC 40 then sends in step 2a an ECR_Entry message to the SS-ECR 50 to create an entry in the SS-ECR 50 for this emergency call. The ECR_Entry message, and therefore the entry in the SS-ECR 50, includes the MTID, ESRK or ESRD (not shown), a PGID (e.g., the MSID as shown) and the uLPN1.

In step 2b, the MSC 40 routes the emergency call to the PSAP 70 using the ESRK and/or ESRD received. The routed emergency call indicates the called party number (CdPN) as "9-1-1", and the calling party number (CgPN) as the uLPN1.

In step 3, the SS-ECR 50 sends an ECR_Entry message to the PSAP-ECR 60. This message includes the MTID, MSID, ESRK or ESRD (not shown) and uLPN1 for the wireless unit 20.

Next, FIG. 3 illustrates that the wireless unit 20 is being handed off from the serving system of MSC 40 to the serving system of MSC 100. Any well-known method of determining handoff may be employed. In step 4a, the MSC 40 sends the handoff request to the MSC 100. The MSC 100 responds in step 4b with a handoff acknowledgement that includes the unique call back number uLPN2 generated and assigned to the wireless unit 20 by the MSC 100, and the MSC 100 further indicates in step 4c that the handoff is complete. Except for generating and communicating the uLPN2 in the handoff acknowledgement, steps 4a-4c will be recognized as a conventional handoff communication flow.

In step 4d, the MSC 40 notifies the SS-ECR 50 associated therewith of the new unique call back number uLPN2 for the wireless unit 20 using a LPN_Update message. The LPN_Update message includes the new call back number uLPN2 and the MTID for the wireless unit 20. Using the MTID, the SS-ECR 50 accesses the entry for the wireless unit 20, and updates the unique call back number by changing the unique call back number from uLPN1 to uLPN2. The MSC 100 will also create an entry in its associated SS-ECR 110 in step 5. The ECR_Entry message sent by the MSC 100, and therefore the entry in the SS-ECR 110, includes the MTID, MSID and the uLPN2 for the wireless unit 20.

In step 6, the SS-ECR 50, in response to updating its entry for the wireless unit 20, sends a LPN_Update message to the PSAP-ECR 60. The LPN_-Update message includes the new call back number uLPN2 and the MTID for the wireless unit 20. Using the MTID, the PSAP-ECR 60 accesses the entry for the wireless unit 20, and updates the unique call back number by changing the unique call back number from uLPN1 to uLPN2.

If the emergency call should drop, as shown in step 7, the PSAP 70 may perform call back to the wireless unit 20 by accessing uLPN2 for the wireless unit 20 from the PSAP-ECR 60 and initiating call back using the uLPN2 as the called party number. As shown, the call back is routed to the MSC 100, which in step 9a sends a PAGE Request to the SS-ECR 110. The PAGE Request includes the uLPN2. Using the uLPN2 as a key or index, the SS-ECR 110 obtains the identification information for the wireless unit associated with the uLPN2, where at least one item of the identification information may be used as a PGID. For example, the identification information may be the MTID and the MSID, where the MSID may serve as the PGID. The SS-ECR 110 responds in step 9b to the PAGE Request with a response that supplies the identification information.

Using the PGID in the identification information (e.g., the MSID), the MSC 100 pages the wireless unit 20 in step 9c. When the wireless unit 20 receives a page with its PGID, the wireless unit 20 sends a page response that includes the MTID of the wireless unit 20 as shown in step 10. If the page response does not match the MTID received by the MSC 100 from the SS-ECR 110, the page response is ignored. However, if the MTIDs match, then the call is established between the PSAP 70 and the wireless unit 20 in the well-known manner. This MTID match test prevents the MSC from erroneously completing the emergency call back to the wrong wireless unit. This is particularly useful for an emergency call originated from non-coded mobile stations, which are using a default MSID that is not necessarily unique.

As will be appreciated from this description, even though the emergency call drops during handoff, a call back may be performed because the new unique call back number was updated at the PSAP-ECR 60 thanks to the unique call back number being sent to the old serving system and updated at the old SS-ECR. Furthermore, call back was effectively performed even though the new serving system was unable to communicate the new unique call back number to the PSAP before the call dropped.

Emergency Call Back Through Intersystem Paging

Figure 1:
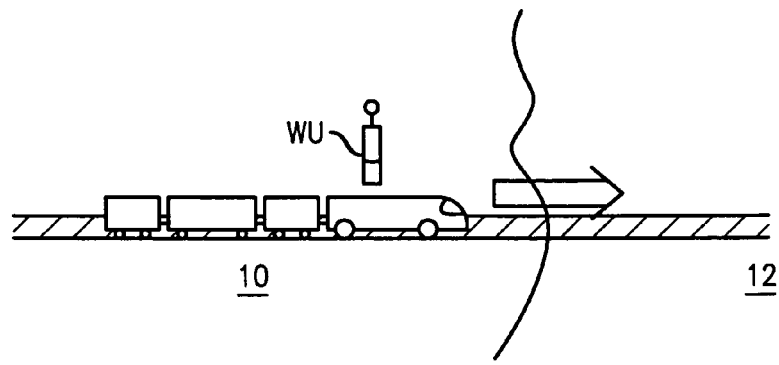
FIG. 1 illustrates a situation for describing one of the hurdles encountered with emergency service calls made by wireless service subscribers that are not encountered with, for example, land line devices.

Next, an embodiment of the method for emergency call back through intersystem paging will be described. For the purposes of example only, this method embodiment will be described with reference to the architecture of FIG. 2. However, it will be understood that the methodologies of the present invention are not limited to this architecture. As discussed with respect to FIG. 1, as a wireless unit 20 roams from an original system to a border system, an emergency call may drop. The method according to the present invention provides ways for emergency call back to take place even though the wireless unit 20 may have moved into the coverage area of a border system.

FIG. 4 illustrates a call flow diagram of an embodiment for emergency call back through intersystem paging according to the present invention. As shown, in call flow step 1, the wireless unit 20 originates an emergency call to the MSC 40 as the original MSC. The origination includes the called or dialed number of "9-1-1", and the MTID and the MSID of the wireless unit 20. The MSC 40 then creates the unique call back number (UCBN) for the emergency call of the wireless unit 20. As shown in FIG. 4, in this example embodiment, a uLPN1 is generated as the UCBN. The MSC 40 then sends in step 2a an ECR_Entry message to the SS-ECR 50 to create an entry in the SS-ECR 50 for this emergency call. The ECR_Entry message, and therefore the entry in the SS-ECR 50, includes the MTID, ESRK or ESRD (not shown), a PGID (e.g., the MSID as shown) and the uLPN1.

In step 2b, the MSC 40 routes the emergency call to the PSAP 70 using the ESRK and/or ESRD received. The routed emergency call indicates the called party number (CdPN) as "9-1-1", and the calling party number (CgPN) as the uLPN 1.

In step 3, the SS-ECR 50 sends an ECR_Entry message to the PSAP-ECR 60. This message includes the MTID, MSID, ESRK or ESRD (not shown) and uLPN1 for the wireless unit 20.

Next, FIG. 4 illustrates that the wireless unit 20 is being dropped in step 4, and in step 5, the PSAP 70 attempts call back using the uLPN1 as the called party number. This results in the call back being routed to the MSC 40. Accordingly, in step 6a the MSC 40 determines that the call is an emergency call back from the calling party number, which identifies the PSAP 70, and the MSC 40 sends a PAGE Request to the SS-ECR 50. The PAGE Request includes the uLPN1. Using the uLPN1 as a key or index, the SS-ECR 50 obtains the identification information for the wireless unit associated with the uLPN1, where at least one item of the identification information may be used as a PGID. For example, the identification information may be the MTID and the MSID, where the MSID may serve as the PGID. The SS-ECR 50 responds to the PAGE Request with a response that supplies the identification information in step 6b.

Using the PGID in the identification information (e.g., the MSID), the MSC 100 pages the wireless unit 20 in step 6c. When an MSC issues a page to a wireless unit for an emergency call back, the MSC sets a timer (not shown). If a page response is not received from the wireless unit being paged when the timer expires, the MSC sends an emergency intersystem page to a group of other wireless systems referred to as border systems in this disclosure. The network operator may determine the identity of border systems, and set them at the MSC. Border systems do not necessarily border the coverage area of the serving system issuing the emergency intersystem page. As will be appreciated, the time period measured by the timer is a controllable parameter set by the network operator.

In the example call flow diagram of FIG. 4, it is assumed that the wireless unit 20 does not respond to the page from the MSC 40, and the timer at MSC 40 for the page expires. Accordingly, in step 7, the MSC 40 sends an intersystem page to the border systems. For the purposes of example, assume one of the border systems includes border-MSC 200, which receives the emergency intersystem page. As shown in FIG. 4, the emergency intersystem page ISPAGE2 identifies the page as being for an emergency call for which no registration, validation or authentication is needed at the home system; hence the name emergency intersystem page. Included in or with the emergency intersystem page are the MSID and MTID of the wireless unit 20, which is the subject of the emergency call back. For example, the emergency intersystem page may be an InterSystemPage2 in ANSI-41 modified to indicate the call type as an emergency.

Each border system receiving the emergency intersystem page uses the MSID or MTID received with the emergency intersystem page to page the wireless unit 20. Therefore, as shown in FIG. 4, the border-MSC 200 pages the wireless unit 20 in step 8. This emergency intersystem paging technique may also be provisioned with priority queuing in the MSCs; wherein a border MSC handles the emergency intersystem page at a higher priority than tasks involving other calls. This should improve the emergency call back completion rate even during peak traffic periods at the border switches.

When a wireless unit answers the page, it provides the paging border MSC with its full MTID. FIG. 4 assumes that the wireless unit 20 has roamed into the coverage area of the border-MSC 200; and therefore, responds to the page from the border-MSC 200 with its MTID. If the MTID in the page response does not match the MTID from that passed to the paging border-MSC 200 in the emergency intersystem page, then the page response is ignored. When the MTID in a page response matches the MTID passed to the paging border-MSC 200 in the emergency intersystem page, then the wireless unit 20 that originated the emergency call has responded to the page. The MTID match test prevents the border-MSC from erroneously completing the emergency call back to the wrong wireless unit. This is particularly useful for an emergency call originated from non-coded mobile stations, which are using a default MSID that is not necessarily unique.

When the MTIDs match, and as shown in step 10, the border-MSC 200 notifies the original MSC 40 that a valid page response has been received. Then, the border-MSC 200 and the original MSC 40 operate in the well-known manner to connect the call from the PSAP 70 (see step 5) such that the emergency call back from the PSAP 70 is delivered to the wireless unit 20, except for additional steps 12-14 (and optionally 15) discussed below. When the callback is connected, the border-MSC automatically initiates a location update, as per existing standard processes for emergency calling, through a Mobile Position Center (MPC), Global Mobile Location Center (GMLC) or other entity associated with the serving system, which performs this function. The location information subsequently returned to the MSC is signaled to the SS-ECR that, in turn, updates the WU location information in the PSAP-ECR for display at the PSAP.

As alluded to above, FIG. 4 further illustrates that the border-MSC 200 creates a new unique call back number (UCBN) for the emergency call of the wireless unit 20. In this example embodiment, a uLPN2 is generated as the UCBN. The border-MSC 200 then sends in step 12 an ECR_Entry message to the border-SS-ECR 210 associated with the border-MSC 200 to create an entry in the border-SS-ECR 210 for the emergency call. The ECR_Entry message, and therefore the entry in the SS-ECR 210, includes the MTID, ESRK or ESRD (not shown), a PGID (e.g., the MSID as shown), the uLPN2, and the location for the wireless unit 20.

In step 13, either border-MSC 200 or the border-SS-ECR 210, may inform the original serving system of the new uLPN2. For example, the border-MSC 200 may communicate the uLPN2 to the MSC 40 (e.g., this may done in step 10 as part of the notification), and then the MSC 40 may issue an LPN_Update to the SS-ECR 50. Alternatively, the border-MSC 200 may trigger the border-SS-ECR 210 to send a LPN_Update message to the SS-ECR 50. FIG. 4 shows the border-SS-ECR 210 sending the LPN_-Update message to the SS-ECR 50. In either case, the LPN_Update message includes the new call back number uLPN2, the MTID and location for the wireless unit 20. Using the MTID, the SS-ECR 50 accesses the entry for the wireless unit 20, and updates the unique call back number by changing the unique call back number from uLPN1 to uLPN2.

In step 14, the SS-ECR 50, in response to updating its entry for the wireless unit 20, sends a LPN_Update message to the PSAP-ECR 60. The LPN_Update message includes the new call back number uLPN2, the MTID and location for the wireless unit 20. Using the MTID, the PSAP-ECR 60 accesses the entry for the wireless unit 20, and updates the unique call back number by changing the unique call back number from uLPN1 to uLPN2. Consequently, if the emergency call should drop, the PSAP 70 may initiate call back to the wireless unit 20 in the border system using the new call back number uLPN2.

It may be the case that the border-MSC 200 is not associated with the same PSAP 70 and PSAP-ECR 60 as the MSC 40. As will be recalled, the uLPN2 includes the LPN2 of the border-MSC 200. Accordingly, from this the PSAP-ECR 60, which includes a table of PSAP and MSC associations, can determine the PSAP/PSAP-ECR 300 associated with the MSC 100 and properly route the Callback message to the PSAP/PSAP-ECR 300 for the border-MSC 200. This is shown as optional step 15 in FIG. 4. The Callback message instructs the PSAP-ECR for the MSC 200 to create an entry, and instructs the PSAP for the MSC 200 to initiate a call back to the wireless unit 20. Accordingly, the Callback message includes the MTID, MSID and uLPN2 for the wireless unit 20. In response to the Callback message, the PSAP 300 for the border-MSC 200 initiates a call back to the wireless unit 20 using uLPN2 as the called party number.

Alternatively, the PSAP 70 may issue a remote emergency call request through the MSC service. Here, the PSAP 70 requests the PSAP-ECR 60 to request the serving MSC (e.g., the border-MSC 200) via the ECR for the serving MSC (e.g., the border-SS-ECR 210) to initiate an emergency call from the wireless unit 20 to the second PSAP 300. The request from the PSAP 70 provides the MTID of the wireless unit 20 and the identifier of the second PSAP 300 or "9-1-1" as the to-be called party number. In performing this remote emergency call request, the PSAP 70 may request that the call be a conference call that includes the PSAP 70. Signaling of the uLPN2 for the wireless unit 20 to the ECR of the second PSAP 300 may take place in the form of communication ECR to ECR (e.g., from the PSAP-ECR 60 to the PSAP-ECR 300) such as discussed previously above.

As will be appreciated from this description, even though the emergency call drops during roaming to a border system, an emergency call back may take place.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof may be implemented in different locations. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention.

I claim:

1. A method of communicating with at least one wireless unit comprising:
    obtaining a paging identifier for the wireless unit in response to an emergency call back using a unique call back identifier for an emergency call placed by the wireless unit, the unique call back identifier includes at least a first set of digits corresponding to a local public safety number associated with and identifying a serving switch for the wireless unit; and
    sending an emergency intersystem page for providing the paging identifier of the wireless unit and for identifying the emergency intersystem page as requesting paging of the wireless unit for an emergency call back.

2. The method of claim 1, wherein the sending step sends a mobile station identifier, MSID, of the wireless unit being paged in the emergency intersystem page.

3. The method of claim 2, wherein the sending step sends a mobile terminal identifier, MTID, of the wireless unit being paged in the emergency intersystem page.

4. The method of claim 1, wherein the sending step sends a mobile terminal identifier, MTID, of the wireless unit being paged in the emergency intersystem page.

5. The method of claim 1, wherein the sending step sends the intersystem page if the wireless unit being paged in the intersystem page fails to respond to an in-system page within a period of time.

6. The method of claim 1, wherein the sending step sends the emergency intersystem page such that the emergency intersystem page is identified as requesting paging of a wireless unit for which no registration, validation and authentication is required.

7. The method of claim 1, further comprising:
    receiving, at the serving switch, the unique call back identifier with an emergency call back.

8. The method of claim 1, further comprising:
    receiving, at the serving switch, the unique call back identifier with an emergency call back, the unique call back identifier including routing information for routing the emergency call back to the serving switch.

9. The method of claim 1, further comprising:
    receiving, at the serving switch, a new unique call back identifier for the emergency call placed by the wireless unit; and
    changing the unique call back identifier at the serving switch to the new unique call back identifier.

10. The method of claim 9, further comprising:
sending a notification, from the serving switch to a public service answering point, of the new unique call back identifier.

11. The method of claim 10, wherein the sending step sends the notification to an emergency call register of the public service answering point.

12. A method of communicating with a mobile station and at least one wireless unit comprising:
receiving an emergency intersystem page from a first serving switch at a second serving switch such that the emergency intersystem page is identifiable as requesting paging of the mobile station for an emergency call back;
paging the wireless unit; and
establishing a unique call back identifier for the wireless unit in response to a page response from the wireless unit, the unique call back identifier includes at least a first set of digits corresponding to a local public safety number associated with and identifying the second serving switch.

13. The method of claim 12, wherein the paging step is performed with priority over other tasks at the second system.

14. The method of claim 12, wherein the receiving step receives an emergency intersystem page such that the emergency intersystem page is identified as requesting paging of a mobile station for which no registration, validation and authentication is required.

15. The method of claim 12, wherein the establishing step establishes the unique call back identifier in an entry of an emergency call back register associated with the second serving switch.

16. The method of claim 12, further comprising:
sending a request to the first serving switch from the second serving switch requesting that the first serving switch change the unique call back identifier for the wireless unit to the unique call back identifier established in the establishing step.

17. The method of claim 12, wherein the unique call back identifier identifies a serving mobile station controller (MSC) within the second serving switch.

18. The method of claim 12, wherein the unique call back identifier includes routing information for routing the emergency call back to the second serving switch.

19. The method of claim 1, wherein the unique call back identifier identifies a serving mobile station controller (MSC) within the serving switch.

* * * * *